(12) United States Patent
Glaser et al.

(10) Patent No.: US 11,840,145 B2
(45) Date of Patent: Dec. 12, 2023

(54) DRIVER STATE DISPLAY

(71) Applicant: GM Global Technology Operations LLC, Detroit, MI (US)

(72) Inventors: Daniel S. Glaser, West Bloomfield, MI (US); Joseph F. Szczerba, Grand Blanc, MI (US); James V. Roell, Clarkston, MI (US); Maureen Elizabeth August, Gross Pointe Woods, MI (US); Paul Gill, Toronto (CA); Yi Guo Glaser, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 145 days.

(21) Appl. No.: 17/572,004

(22) Filed: Jan. 10, 2022

(65) Prior Publication Data

US 2023/0219415 A1 Jul. 13, 2023

(51) Int. Cl.
*B60K 35/00* (2006.01)
*G08C 17/02* (2006.01)
*G08B 21/18* (2006.01)
*B60Q 9/00* (2006.01)

(52) U.S. Cl.
CPC ............ *B60K 35/00* (2013.01); *G08B 21/182* (2013.01); *G08C 17/02* (2013.01); *B60K 2370/167* (2019.05); *B60K 2370/175* (2019.05); *B60K 2370/178* (2019.05); *B60K 2370/186* (2019.05); *B60K 2370/52* (2019.05); *B60Q 9/008* (2013.01)

(58) Field of Classification Search
CPC .............. B60K 35/00; B60K 2370/167; B60K 2370/175; B60K 2370/178; B60K 2370/186; B60K 2370/52; G08B 21/182; G08C 17/02; B60Q 9/008
See application file for complete search history.

(56) References Cited

U.S. PATENT DOCUMENTS

| 6,974,414 | B2 * | 12/2005 | Victor | G06V 20/597 340/576 |
| 8,542,108 | B1 * | 9/2013 | Izdepski | G09G 5/00 340/459 |
| 10,723,367 | B2 * | 7/2020 | Tamagaki | G08G 1/0962 |
| 2013/0038437 | A1 * | 2/2013 | Talati | G06Q 10/10 340/438 |
| 2014/0222277 | A1 * | 8/2014 | Tsimhoni | B60W 30/00 701/23 |
| 2015/0002286 | A1 * | 1/2015 | Kasai | B60K 35/00 340/438 |

(Continued)

FOREIGN PATENT DOCUMENTS

WO    WO-2020006154 A2 *  1/2020 ............ B60R 11/04

*Primary Examiner* — Chico A Foxx
(74) *Attorney, Agent, or Firm* — Vivacqua Crane, PLLC

(57) ABSTRACT

A system for providing driver status to a driver of a vehicle includes a data processor, a plurality of sensors mounted within the vehicle and adapted to send vehicle information to the data processor, a driver monitoring system within the vehicle adapted to send driver information to the data processor, the data processor further adapted to collect information from external sources via a wireless data communication network, and a driver state display adapted to receive information from the data processor and to display a short-term status indicator, a long-term status indicator and contextual information.

20 Claims, 4 Drawing Sheets

(56) References Cited

U.S. PATENT DOCUMENTS

| | | | |
|---|---|---|---|
| 2015/0221247 A1* | 8/2015 | Herger | G02B 27/017 |
| | | | 345/8 |
| 2016/0250968 A1* | 9/2016 | Shirakata | B60K 28/066 |
| | | | 340/576 |
| 2017/0174230 A1* | 6/2017 | Goldman-Shenhar | ........................ |
| | | | B60K 35/00 |
| 2017/0313319 A1* | 11/2017 | Kishi | B60W 10/18 |
| 2018/0096475 A1* | 4/2018 | Jemander | G01S 13/582 |
| 2018/0144636 A1* | 5/2018 | Becker | B60W 30/0956 |
| 2018/0173230 A1* | 6/2018 | Goldman-Shenhar | ........................ |
| | | | B60W 50/14 |
| 2019/0256106 A1* | 8/2019 | Lee | B60W 50/14 |
| 2020/0172113 A1* | 6/2020 | Kim | B60W 50/0098 |
| 2020/0290630 A1* | 9/2020 | Elwart | B60W 40/08 |
| 2021/0094583 A1* | 4/2021 | Choi | B60W 50/16 |
| 2021/0209922 A1* | 7/2021 | Yang | B60W 60/0055 |
| 2022/0063652 A1* | 3/2022 | Taylor | B60W 30/17 |
| 2022/0144284 A1* | 5/2022 | Conners | B60W 40/08 |
| 2023/0082390 A1* | 3/2023 | Hayes | G01C 21/3691 |
| 2023/0202499 A1* | 6/2023 | Lee | B60W 50/14 |
| | | | 340/438 |

* cited by examiner

DRIVER STATE DISPLAY

INTRODUCTION

The present disclosure relates to a system and method for displaying a driver's state of attentiveness. Current systems use sensors and driver monitoring systems to "watch" a driver and in the event the driver becomes distracted provide alerts or warnings to bring the driver's attention back to driving. These systems generally operate on a binary basis, meaning that either the system determines that the driver is paying sufficient attention, or the driver is not paying sufficient attention. In such systems action is taken when the system determines that the driver is not paying sufficient attention.

Thus, while current systems and methods achieve their intended purpose, there is a need for a new and improved system and method for providing a display of driver status that displays both a short-term status indicator that provides an indication of the current status of the driver as well as a long-term status indicator that provides an indication of how the status of the driver is trending.

SUMMARY

According to several aspects of the present disclosure, a system for providing driver status to a driver of a vehicle includes a data processor, a plurality of sensors mounted within the vehicle and adapted to send vehicle information to the data processor, a driver monitoring system within the vehicle adapted to send driver information to the data processor, the data processor further adapted to collect information from external sources via a wireless data communication network, and a driver state display adapted to receive information from the data processor and to display a short-term status indicator, a long-term status indicator and contextual information.

According to another aspect of the system, the short-term status indicator is a graphical indicator of a current driver status.

According to another aspect of the system, the long-term status indicator is one of a plurality of long-term graphical indicators that represent how the driver status is trending.

According to another aspect of the system, the long-term graphical indicators are adapted to alert a driver to gradual changes in driver status indicating increased driver distraction prior to vehicle alert warnings.

According to another aspect of the system, the plurality of long-term graphical indicators includes a first long-term graphical indicator that represents an exceptional driver status, a second long-term graphical indicator that represents a normal driver status, a third long-term graphical indicator that represents a cautionary driver status, and a fourth long-term graphical indicator that represents an extreme driver status.

According to another aspect of the system, the data processor is further adapted to run a driver status algorithm and update a displayed short-term status indicator and a displayed long-term status indicator based on outputs from the driver status algorithm.

According to another aspect of the system, the data processor is further adapted to update thresholds within the driver status algorithm based on information of environmental factors collected by the external sources.

According to another aspect of the system, the data processor is further adapted to update thresholds within the driver status algorithm based on an autonomous level of the vehicle.

According to another aspect of the system, the contextual information includes an explanation of the displayed long-term driver status and suggestions to improve the long-term driver status.

According to several aspects of the present disclosure, a method of providing driver status to a driver of a vehicle includes collecting, with a data processor located within the vehicle, vehicle information from a plurality of sensors mounted within the vehicle, collecting, with the data processor, driver information from a driver monitoring system within the vehicle, collecting, with the data processor, information from external sources via a wireless data communication network, sending, with the data processor, information to a driver state display within the vehicle, and displaying, via the driver state display, a short-term status indicator, a long-term status indicator and contextual information.

According to another aspect of the method, the displaying, via the driver state display, a short-term status indicator further includes displaying a graphical indicator of a current driver status.

According to another aspect of the method, the displaying, via the driver state display, a long-term status indicator further includes displaying one of a plurality of long-term graphical indicators that represent how the driver status is trending.

According to another aspect of the method, the long-term graphical indicators are adapted to alert a driver to gradual changes in driver status indicating increased driver distraction prior to vehicle alert warnings.

According to another aspect of the method, the displaying one of a plurality of long-term graphical indicators of how the driver status is trending further includes displaying one of a first long-term graphical indicator that represents an exceptional driver status, a second long-term graphical indicator that represents a normal driver status, a third long-term graphical indicator that represents a cautionary driver status, and a fourth long-term graphical indicator that represents an extreme driver status.

According to another aspect of the method, the sending, with the data processor, information to the driver state display and displaying, via the driver state display, the short-term status indicator and the long-term status indicator further includes running with the data processor, a driver status algorithm adapted to determine a driver status based on information from the driver monitoring system, and updating a displayed short-term status indicator and a displayed long-term status indicator based on outputs from the driver status algorithm.

According to another aspect, the method includes updating thresholds within the driver status algorithm based on information of environmental factors collected by the external sources.

According to another aspect, the method includes updating thresholds within the driver status algorithm based on an autonomous level of the vehicle.

According to another aspect of the method, the displaying, via the driver state display, contextual information further includes displaying, via the driver state display, information to the driver explaining the long-term driver status and providing suggestions to improve the long-term driver status.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
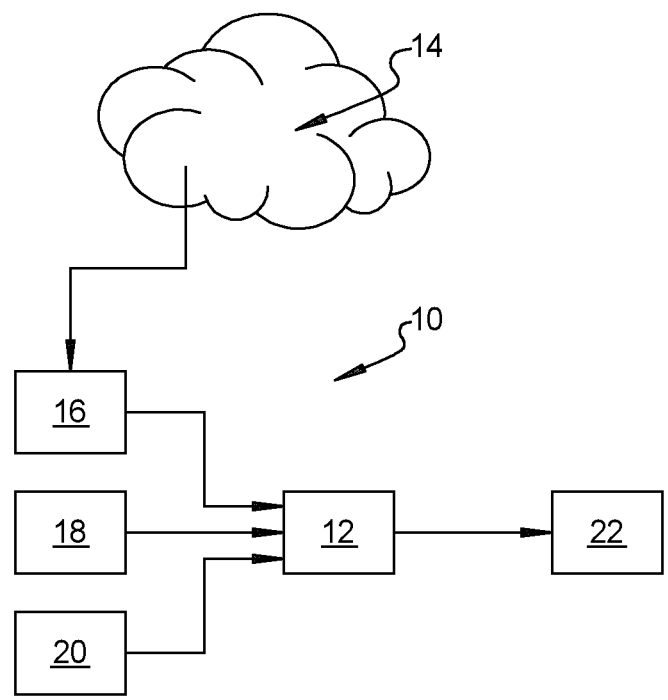
FIG. 1 is a schematic diagram of a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 for providing driver status to a driver of a vehicle includes a data processor 12 that is adapted to collect information from external sources 14 via a wireless data communication network 16, a plurality of sensors 18 mounted within the vehicle and adapted to send vehicle information to the data processor 12, a driver monitoring system 20 within the vehicle adapted to send driver information to the data processor 12, and a driver state display 22 adapted to receive information from the data processor 12.

The data processor 12 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The data processor 12 is adapted to collect information from external sources 14 via a wireless data communication network 16. The data processor 12 includes a transceiver which allows the data processor 12 to communicate wirelessly with remote databases of external sources 14 over a WLAN, 4G or 5G network, or the like. Such databases can be communicated with directly via the internet, or may be cloud based databases. Information that may be collected by the data processor 12 from such external sources 14 includes, but is not limited to road and highway databases maintained by the department of transportation, a global positioning system, the internet, other vehicles via V2V communication networks, traffic information sources, vehicle based support systems such as OnStar, etc.

The plurality of sensors 18 mounted within the vehicle and adapted to send vehicle information to the data processor 12 may include, but is not limited to, vehicle sensors adapted to monitor operating conditions of the vehicle, such as speed, steering wheel input, braking, cruise control, acceleration, as well as an infotainment system for the vehicle, and vehicle control systems within the vehicle. The plurality of sensors may also include mobile devices of the driver that are equipped with applications allowing communication and control of onboard vehicle systems.

The driver monitoring system 20 within the vehicle is adapted to monitor behavior of the driver of the vehicle. Driver-monitoring systems typically use a driver-facing camera equipped with infrared light-emitting diodes (LEDs) or lasers so that it can "see" the driver's face, even at night, and see the driver's eyes even if the driver is wearing dark sunglasses. Advanced on-board software collects data points from the driver and creates an initial baseline of what the driver's normal, attentive state looks like. The software can then determine whether the driver is blinking more than usual, whether the eyes are narrowing or closing, and whether the head is tilting at an odd angle. It can also determine whether the driver is looking at the road ahead, and whether the driver is actually paying attention or just absent-mindedly staring. The driver monitoring system 20 uses cameras and sensors to monitor behaviors of the driver including, but not limited to eye gaze behavior/patterns, body posture and hand locations. The driver monitoring system 20 may further monitor physiological characteristics of the driver such as, but not limited to, heartrate, respiration, galvanic skin response, EEG and skin temperature.

The data processor 12 uses information gathered by the driver monitoring system 20 to determine if the driver of the vehicle is distracted, drowsy, intoxicated, experiencing biomedical or other fitness distress, etc. The data processor 12 may communicate with vehicle systems which take action to get the driver's attention by issuing audio alerts, lighting up a visual indicator on the dashboard or vibrating the seat. If the data processor determines that the driver is distracted while the vehicle's external sensors determine it is about to have a collision, the vehicle systems could automatically apply the brakes, using information from interior and exterior sensor fusion.

Figure 2:
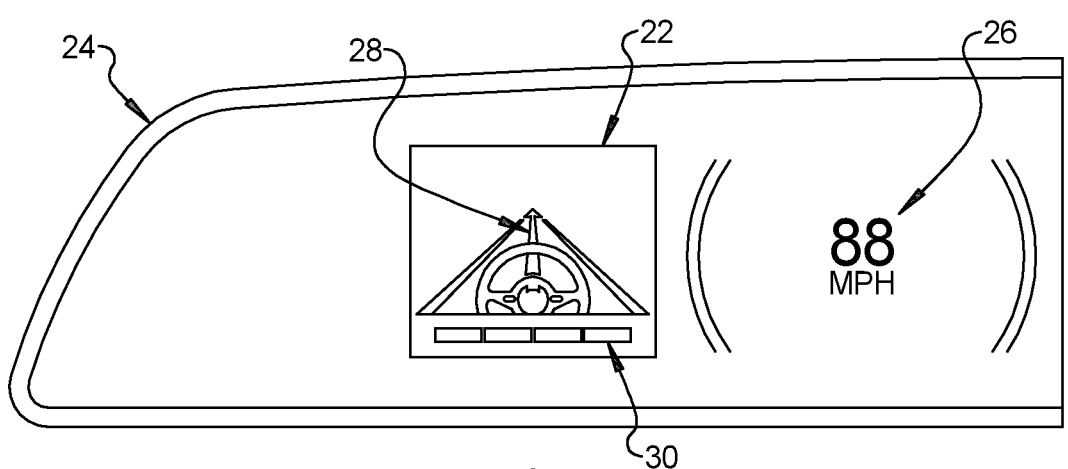
FIG. 2 is perspective view of a portion of an instrument cluster display including a driver state display in accordance with an exemplary embodiment of the present disclosure.
Figure 3A:
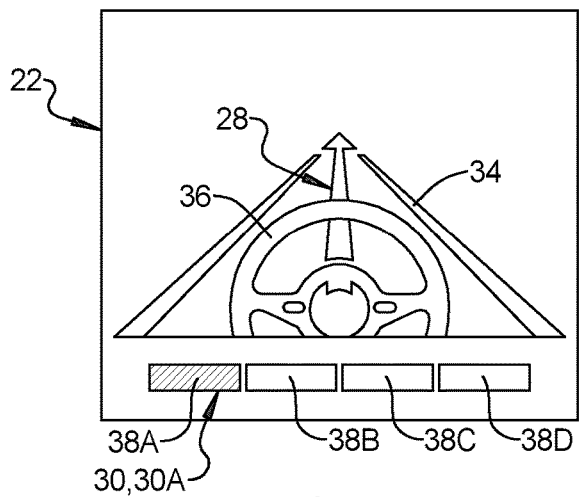
FIG. 3A is a perspective view of a driver state display including a first long-term status indicator.
Figure 3B:
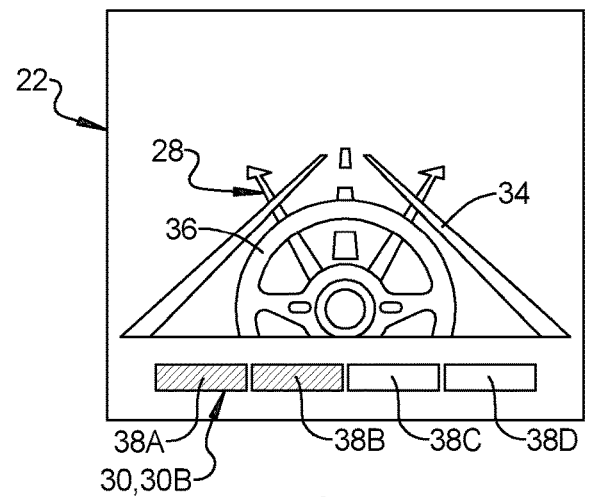
FIG. 3B is a perspective view of a driver state display including a second long-term status indicator.
Figure 3C:
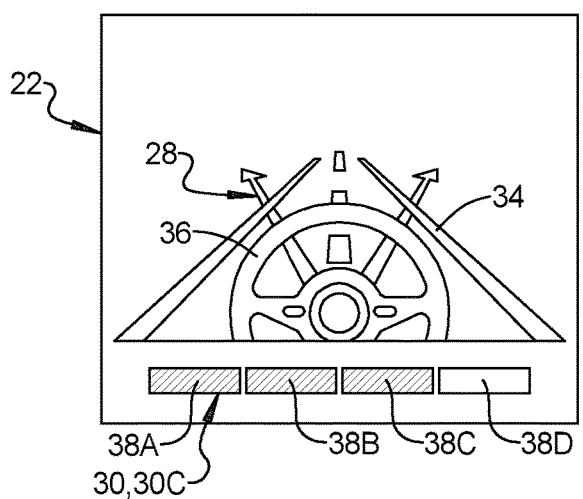
FIG. 3C is a perspective view of a driver state display including a third long-term status indicator.
Figure 3D:
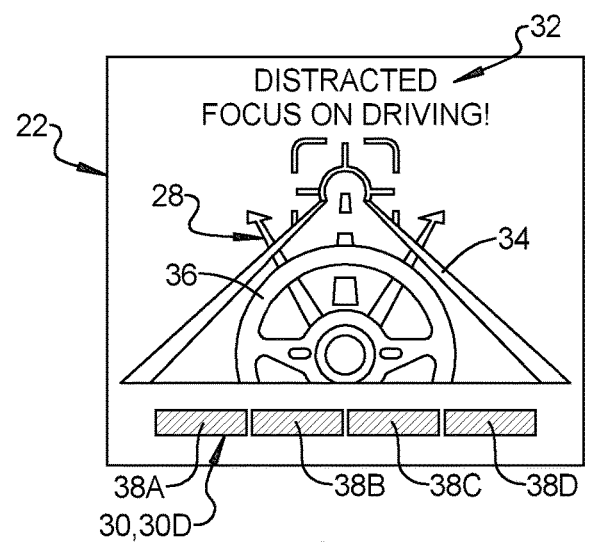
FIG. 3D is a perspective view of a driver state display including a fourth long-term status indicator.

The data processor 12 is adapted to communicate with the driver state display 22. Referring to FIG. 2, a portion of an instrument cluster display 24 is shown. The instrument cluster display 24 includes a speed display 26 and the driver state display 22. The driver state display includes a short-term status indicator 28, a long-term status indicator 30 and contextual information 32. Referring to FIG. 3A, in an exemplary embodiment, the short-term status indicator 28 is a graphical indicator of a current driver status. In the example shown in the Figures, the driver state display includes a graphical representation of the roadway 34, a graphical representation of a steering wheel 36, and the short-term status indicator 28 is an arrow that indicates the current, real-time, level of attentiveness of the driver. In FIG. 3A, the short-term indicator 28 is a single arrow that is aligned with the graphical representation of the roadway 34, indicating that the driver is not distracted. In FIG. 3B, FIG. 3C and FIG. 3D, the short-term indicator 28 is a pair of arrows angled outward, indicating that the driver of the vehicle is at least slightly distracted and not paying close attention to the roadway ahead.

The long-term status indicator 30 is one of a plurality of long-term graphical indicators 30A, 30B, 30C, 30D that represent how the driver status is trending. The long-term graphical indicators 30A, 30B, 30C, 30D are adapted to alert a driver to gradual changes in driver status indicating increased driver distraction prior to vehicle alert warnings. In an exemplary embodiment, the long-term status indicator 30 includes four selectively lighted indicator boxes 38A, 38B, 38C, 38D.

Referring to FIG. 3A, the driver state display 22 includes a first long-term graphical indicator 30A that represents an exceptional driver status. For the first long-term indicator 30A, a first selectively lighted indicator box 38A is illuminated. In an exemplary embodiment, the first selectively lighted indicator box 38A is illuminated with a green color. The first long-term graphical indicator 30A indicates to the driver that the driver is, and has been, driving in an un-distracted manner.

Referring to FIG. 3B, the driver state display 22 includes a second long-term graphical indicator 30B that represents a normal driver status. For the second long-term indicator 30B, the first selectively lighted indicator box 38A and a second selectively lighted indicator box 38B are illuminated. In an exemplary embodiment, the first and second selectively lighted indicator boxes 38A, 38B are illuminated with a yellow color. The second long-term graphical indicator 30B indicates to the driver that the driver is, and has been, driving with a level of distraction that is considered normal according to pre-determined thresholds applied by the data processor 12.

Referring to FIG. 3C, the driver state display 22 includes a third long-term graphical indicator 30C that represents a cautionary driver status. For the third long-term indicator 30C, the first selectively lighted indicator box 38A, the second selectively lighted indicator box 38B, and a third selectively lighted indicator box 38C are illuminated. In an exemplary embodiment, the first, second and third selectively lighted indicator boxes 38A, 38B, 38C are illuminated with an orange color. The third long-term graphical indicator 30C indicates to the driver that the level of distraction of the driver is trending toward a level of distraction that will trigger distracted driving alerts from the vehicle. The third long-term graphical indicator 30C is adapted to give the driver a warning ahead of any active response that the vehicle may take in response to a determination by the driver monitoring system 20 that the driver is distracted.

Referring to FIG. 3D, the driver state display 22 includes a fourth long-term graphical indicator 30D that represents an extreme driver status. For the fourth long-term indicator 30D, the first selectively lighted indicator box 38A, the second selectively lighted indicator box 38B, the third selectively lighted indicator box 38C, and a fourth selectively lighted indicator box 38D are illuminated. In an exemplary embodiment, the first, second, third and fourth selectively lighted indicator boxes 38A, 38B, 38C, 38D are illuminated with an red color. The fourth long-term graphical indicator 30D indicates to the driver that the level of distraction of the driver exceeds what is considered normal according to the pre-determined thresholds applied by the driver monitoring system 20 and the data processor 12, and that active response (alerts, vibrating seat, modification of autonomous control) by the vehicle is imminent. The fourth long-term graphical indicator 30D is adapted to give the driver a warning that the driver must modify driving behavior immediately to avoid active distracted driving alerts by the vehicle.

Referring again to FIG. 3D, the driver status display is adapted to display contextual information 32. In an exemplary embodiment, the contextual information includes an explanation of the displayed long-term driver status and suggestions to improve the long-term driver status. As shown in the example of FIG. 3D, the contextual information 32 includes a printed message "Distracted", indicating that the driver is distracted, and a suggestion "Focus on driving!", to get the driver's attention and motivate the driver to improve attentiveness.

The data processor uses the information collected from the external sources 14, the plurality of sensors 18 and the driver monitoring system 20 to run a driver status algorithm 40 and update a displayed short-term status indicator 28 and a displayed long-term status indicator 30 based on outputs from the driver status algorithm 40. The data processor 12 runs the driver status algorithm 40 on a repeating pre-determined interval. In an exemplary embodiment, the data processor 12 runs the driver status algorithm 40 once every ten seconds.

Figure 4:
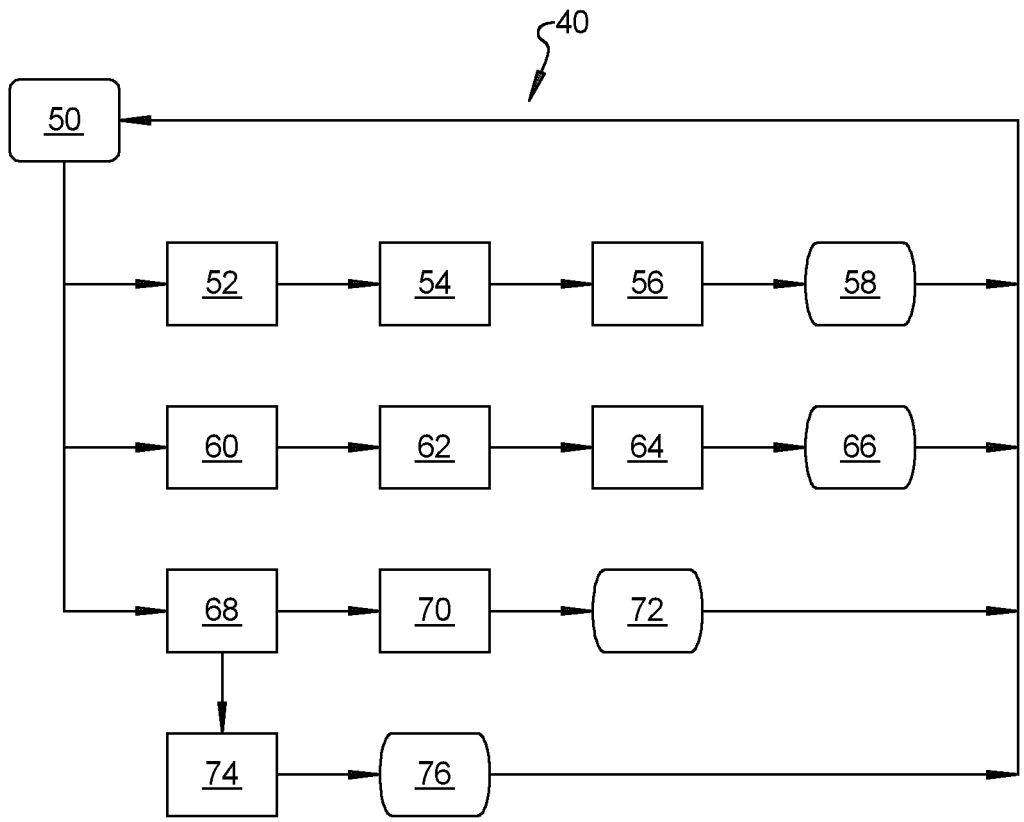
FIG. 4 is flow chart illustrating a driver status algorithm in accordance with an exemplary embodiment of the present disclosure.

Referring to FIG. 4, an exemplary embodiment of the driver status algorithm 40 is shown. The algorithm 40 begins at block 50, when a driver begins driving the vehicle. For a first criteria, moving to block 52, the data processor 12 determines if the driver's eyes were properly focused on the road for more than 85% of the previous pre-determined interval. Moving to block 54, the data processor 12 determines if the driver's eyes were continuously focused on the road for time intervals averaging at least four (4) seconds during the previous pre-determined interval. Moving to block 56, the data processor 12 determines if the driver's eyes were continuously distracted from the road for time intervals averaging less than one (1) second during the previous pre-determined interval. Moving to block 58, if the driver's eyes were properly focused on the road for more than 85% of the previous pre-determined interval, and the driver's eyes were continuously focused on the road for time intervals averaging at least four (4) seconds during the previous pre-determined interval, and the driver's eyes were continuously distracted from the road for time intervals averaging less than one (1) second during the previous pre-determined interval, then the data processor 12 will alter the long-term status indicator 30 by decreasing the indication by one.

For example, if the currently displayed long-term status indicator 30 is the third long-term graphical indicator 30C, and, at the next running of the driver status algorithm 40, the data processor determines that the driver's eyes were properly focused on the road for more than 85% of the previous pre-determined interval, and the driver's eyes were continuously focused on the road for time intervals averaging at least four (4) seconds during the previous pre-determined interval, and the driver's eyes were continuously distracted from the road for time intervals averaging less than one (1) second during the previous pre-determined interval, then the data processor 12 will update the long-term status indicator 30 by changing from the third long-term graphical indicator 30C to the second long-term graphical indicator 30B. If the currently displayed long-term status indicator 30 is the first long-term graphical indicator 30A, then no action is taken.

For a second criteria, moving from block 50 to block 60, the data processor 12 determines if the driver's eyes were properly focused on the road for less than 50% of the previous pre-determined interval. Moving to block 62, the data processor 12 determines if the driver's eyes were continuously distracted from the road for time intervals averaging more than one and a half (1.5) seconds, and if the number of glances away from the road were more than one (1) during the previous pre-determined interval. Moving to block 64, the data processor 12 determines if the driver's eyes were continuously distracted from the road for a single time interval exceeding three (3) seconds during the previous pre-determined interval. Moving to block 66, if the driver's eyes were properly focused on the road for less than 50% of the previous pre-determined interval, or, if the driver's eyes were continuously distracted from the road for time intervals averaging more than one and a half (1.5) seconds, and if the number of glances away from the road were more than one (1) during the previous pre-determined interval, or, if the driver's eyes were continuously distracted from the road for a single time interval exceeding three (3) seconds during the previous pre-determined interval, then the data processor 12 will alter the long-term status indicator 30 by increasing the indication by one.

For example, if the currently displayed long-term status indicator 30 is the second long-term graphical indicator 30B, and, at the next running of the driver status algorithm 40, the data processor determines that the driver's eyes were properly focused on the road for less than 50% of the previous pre-determined interval, or, if the driver's eyes were continuously distracted from the road for time intervals averaging more than one and a half (1.5) seconds, and if the number of glances away from the road were more than one (1) during the previous pre-determined interval, or, if the driver's eyes were continuously distracted from the road for a single time interval exceeding three (3) seconds during the previous pre-determined interval, then the data processor 12 will update the long-term status indicator 30 by changing from the second long-term graphical indicator 30B to the third long-term graphical indicator 30C. If the currently displayed long-term status indicator 30 is the fourth long-term graphical indicator 30D, then no action is taken.

Moving from block 50 to block 68, if less than all of the first criteria in blocks 52, 54 and 56 are satisfied, and if none of the second criteria in blocks 60, 62 and 64 are satisfied, and, moving to block 70, the long-term status indicator 30 is currently displaying the fourth long-term graphical indicator 38D, moving to block 72, the data processor 12 will update the long-term status indicator 30 by changing from the fourth long-term graphical indicator 30D to the third long-term graphical indicator 30C.

Alternately, if less than all of the first criteria in blocks 52, 54 and 56 are satisfied, and if none of the second criteria in blocks 60, 62 and 64 are satisfied at block 68, then, moving to block 74, if the long-term status indicator 30 is currently displaying the first long-term graphical indicator 38A, moving to block 76, the data processor 12 will update the long-term status indicator 30 by changing from the first long-term graphical indicator 30A to the second long-term graphical indicator 30B.

In an exemplary embodiment, the data processor 12 is further adapted to update thresholds within the driver status algorithm 40 based on information of environmental factors collected by the external sources 14. For example, if the vehicle is travelling in poor weather conditions or weather conditions will deteriorate soon, then it would be beneficial for the driver of the vehicle to pay closer attention to the road. Therefore, if information collected by the data processor 12 indicates that the vehicle is travelling in poor weather conditions or that weather conditions will deteriorate soon, then the data processor 12 will change the thresholds of what is considered "exceptional", "normal", "cautionary" and "extreme" distracted driving by the driver of the vehicle. This will cause the system 10 to more strictly monitor the driving behaviors of the driver to keep the driver more focused when traveling in poor weather conditions.

In another exemplary embodiment, the data processor 12 is further adapted to update thresholds within the driver status algorithm 40 based on an autonomous level of the vehicle. Autonomous vehicle are rated at a level depending on how automated the driving of the vehicle is. Level 0 automation means that the vehicle is not equipped with any automation. The driver is in full control of the vehicle, with zero automated assistance at all times. Level 1 automation is the lowest level of automated/assisted vehicle operation. The human driver is in full control, but gets a minimal amount of guidance from a single advanced driver assistance system (ADAS), for things like acceleration, cruise control or braking, generally for one task at a time. With Level 2 automation, or "Partial Driving Automation", the human driver is still in full control of the vehicle, with full attention to the road, but assistance from the ADAS is a little more refined. The ADAS has combined automated functions, which for the human means the system could potentially control both steering and braking/accelerating simultaneously. Level 3 automation, or Conditional Driving Automation, is where the vehicle operates fully automated, but requires full human supervision in case of a needed override. In this case, the vehicle can operate on its own in certain circumstances. Functions like steering, braking, and acceleration are automated, but the driver has to be ready to step in. Level 4 automation, or High Driving Automation, is "minds off," as the car can perform all driving tasks, and can intervene if something goes awry. That said, Level 4 only works for location-restricted trips driving from point A to point B and back. Level 5 automation is full automation. This is the aspirational goal for autonomous vehicles. With fully automated self-driving cars, you could basically read a book or play on your phone, as the vehicle can perform all driving tasks under all circumstances.

Thus, as the level of automation goes up in a vehicle, the amount of attention required by the driver decreases. Thus, the data processor 12 will apply different thresholds of what is considered "exceptional", "normal", "cautionary" and "extreme" distracted driving by the driver of the vehicle, depending on the level of automation of the vehicle.

Figure 5:
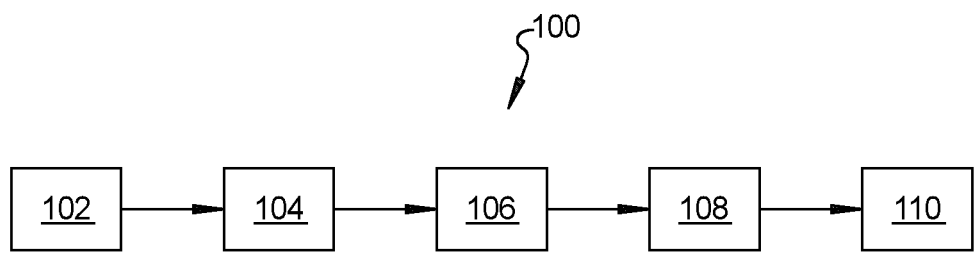
FIG. 5 is a flow chart illustrating a method in accordance with an exemplary embodiment of the present disclosure.

Referring to FIG. 5, a method 100 of providing driver status to a driver of a vehicle includes, starting at block 102, collecting, with the data processor 12 located within the vehicle, vehicle information from a plurality of sensors 18 mounted within the vehicle, moving to block 104, collecting, with the data processor 12, driver information from a driver monitoring system 20 within the vehicle, moving to block 106, collecting, with the data processor 12, information from external sources 14 via a wireless data communication network 16, moving to block 108, sending, with the data processor 12, information to a driver state display 22 within the vehicle, and, moving to block 110, displaying, via the driver state display 22, a short-term status indicator 28, a long-term status indicator 30 and contextual information 32.

In an exemplary embodiment, the displaying, via the driver state display 22, a short-term status indicator 28 at block 110 further includes displaying a graphical indicator of a current driver status as discussed above. Further, the displaying, via the driver state display 22, a long-term status indicator 30, at block 110 further includes displaying one of a plurality of long-term graphical indicators 30A, 30B, 30C, 30D that represent how the driver status is trending and are adapted to alert a driver to gradual changes in driver status indicating increased driver distraction prior to vehicle alert warnings. The plurality of long-term graphical indicators 30A, 30B, 30C, 30D includes a first long-term graphical indicator 30A that represents an exceptional driver status, a second long-term graphical indicator 30B that represents a normal driver status, a third long-term graphical indicator 30C that represents a cautionary driver status, and a fourth long-term graphical indicator 30D that represents an extreme driver status.

In an exemplary embodiment, the sending, with the data processor 12, information to the driver state display 22 and displaying, via the driver state display 22, the short-term status indicator 28 and the long-term status indicator 30, at blocks 108 and 110 further includes running with the data processor 12, a driver status algorithm 40 adapted to determine a driver status based on information from the driver monitoring system 20, and updating a displayed short-term status indicator 28 and a displayed long-term status indicator 30 based on outputs from the driver status algorithm 40.

In another exemplary embodiment, the method 100 further includes updating thresholds within the driver status algorithm 40 based on information of environmental factors collected by the external sources 14 and based on an autonomous level of the vehicle.

In another exemplary embodiment, the displaying, via the driver state display 22, contextual information 32 at block 110 further includes displaying, via the driver state display 22, information to the driver explaining the long-term driver status and providing suggestions to improve the long-term driver status.

Figure 6:
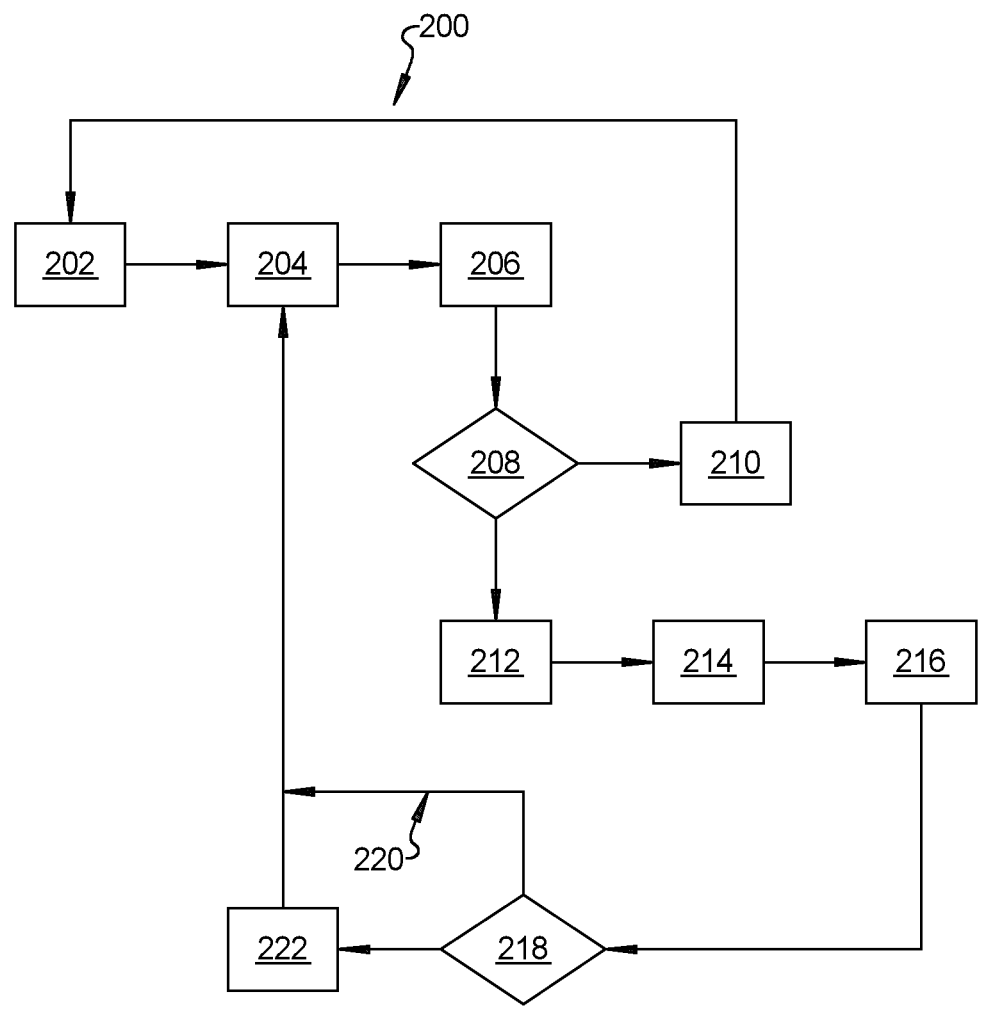
FIG. 6 is a flow chart illustrating an exemplary implementation of the method shown in FIG. 5.

Referring to FIG. 6, a flow chart 200 illustrating an exemplary embodiment of the method 100 is shown. Beginning at block 200 a driver begins driving the vehicle. Moving to block 204 the driver monitoring system gathers information on the driver's behaviors and sends the information to the data processor 12. Moving to block 206, the data processor 12 runs the driver status algorithm, using information received from the driver monitoring system 20. Moving to block 208, the data processor 12 determines if the driver's behavior meets pre-determined threshold criteria for distracted driving conditions, such as distracted, drowsy, intoxicated, impaired, stressed.

Moving to block 210, if the driver's behavior does not meet pre-determined threshold criteria for distracted driving within the driver status algorithm 40, then no action is taken.

If the driver's behavior meets pre-determined threshold criteria for distracted driving within the driver status algorithm 40, then, moving to block 212, the data processor 12 determines if the currently displayed short-term status indicator 28 requires updating, and if so, updates the displayed short-term term status indicator 28. Moving to block 214, the data processor 12 determines if the currently displayed long-term status indicator 30 requires updating, and if so, updates the displayed long-term status indicator 30. Moving to block 216, the data processor 12 determines if the currently displayed contextual information 32 requires updating, and if so, updates the displayed contextual information 32.

Moving to block 218, the data processor 12 determines if information collected by the external sources 14, such as time of day, weather conditions and other environmental factors, calls for altering thresholds within the driver status algorithm 40. If the data processor 12 determines that such information does not demand updating the thresholds within the driver status algorithm 40, the, as indicated by arrow 220, the method circles back to block 204. If the data processor 12 determines that such information demands updating the thresholds within the driver status algorithm 40, then, moving to block 222, the thresholds within the driver status algorithm 40 are updated accordingly.

A system and method of the present disclosure offers several advantages. These include displaying a driver status that displays both a short-term status indicator 28 that provides an indication of the current status of the driver as well as a long-term status indicator 30 that provides an indication of how the status of the driver is trending. The short-term status indicator 28 provides a real-time indication of how distracted the driver of the vehicle is and the long-term status indicator 30 provides an indication of how the driver's behavior is trending to provide the driver with a warning that the driver must modify driving behavior to avoid active distracted driving alerts by the vehicle. In addition, Contextual information 32 displayed by the driver status display 22 provides an explanation of the displayed long-term status indicator 30 and suggestions to improve the long-term status indicator 30.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing driver status to a driver of a vehicle, comprising:
   a data processor;
   a driver monitoring system within the vehicle adapted to send driver information to the data processor;
   the data processor further adapted to collect information from external sources via a wireless data communication network; and
   a driver state display adapted to receive information from the data processor and to display a short-term status indicator, a long-term status indicator and contextual information;
   wherein, the long-term status indicator is one of a plurality of long-term graphical indicators that represent how the driver status is trending and is adapted to alert a driver to gradual changes in driver status prior to vehicle alert warnings;
   wherein the driver status is based on a predetermined time interval of the driver's proper focus, on the road in front of the vehicle, indicating driver attentiveness.

2. The system of claim 1, wherein the short-term status indicator is a graphical indicator of a current driver status.

3. The system of claim 2, wherein the plurality of long-term graphical indicators includes a first long-term graphical indicator that represents an exceptional driver status, a second long-term graphical indicator that represents a normal driver status, a third long-term graphical indicator that represents a cautionary driver status, and a fourth long-term graphical indicator that represents an extreme driver status.

4. The system of claim 3, wherein the data processor is further adapted to run a driver status algorithm and update a displayed short-term status indicator and a displayed long-term status indicator based on outputs from the driver status algorithm.

5. The system of claim 4, wherein the data processor is further adapted to update thresholds within the driver status algorithm based on information of environmental factors collected by the external sources.

6. The system of claim 5, wherein the data processor is further adapted to update thresholds within the driver status algorithm based on an autonomous level of the vehicle.

7. The system of claim 6, wherein the contextual information includes an explanation of the displayed long-term driver status and suggestions to improve the long-term driver status.

8. The system of claim 4, wherein the data processor is adapted to:
   determine if the driver's eyes were properly focused on the road for more than 85% of a previous pre-determined interval;
   determine if the driver's eyes were continuously focused on the road for time intervals averaging at least four (4) seconds during the previous pre-determined interval; and
   determine if the driver's eyes were continuously distracted from the road for time intervals averaging less than one (1) second during the previous pre-determined interval;
wherein, the data processor is adapted to alter the long-term status indicator by decreasing the indication by one when:
   the driver's eyes were properly focused on the road for more than 85% of the previous pre-determined interval;
   the driver's eyes were continuously focused on the road for time intervals averaging at least four (4) seconds during the previous pre-determined interval; and
   the driver's eyes were continuously distracted from the road for time intervals averaging less than one (1) second during the previous pre-determined interval.

9. The system of claim 8, wherein the data processor is adapted to:
   determine if the driver's eyes were properly focused on the road for less than 50% of the previous pre-determined interval;
   determine if the driver's eyes were continuously distracted from the road for time intervals averaging more than one and a half (1.5) seconds; and
   determine if the number of glances away from the road were more than one (1) during the previous pre-determined interval;
wherein, the data processor is adapted to alter the long-term status indicator by increasing the indication by one when at least one of:
   the driver's eyes were continuously distracted from the road for a single time interval exceeding three (3) seconds during the previous pre-determined interval;
   the driver's eyes were properly focused on the road for less than 50% of the previous pre-determined interval;
   the driver's eyes were continuously distracted from the road for time intervals averaging more than one and a half (1.5) seconds, and the number of glances away from the road were more than one (1) during the previous pre-determined interval; and
   the driver's eyes were continuously distracted from the road for a single time interval exceeding three (3) seconds during the previous pre-determined interval.

10. A method of providing driver status to a driver of a vehicle, comprising:
    collecting, with a data processor located within the vehicle, vehicle information from a plurality of sensors mounted within the vehicle;
    collecting, with the data processor, driver information from a driver monitoring system within the vehicle;
    collecting, with the data processor, information from external sources via a wireless data communication network;
    sending, with the data processor, information to a driver state display within the vehicle; and
    displaying, via the driver state display, a short-term status indicator, a long-term status indicator and contextual information, wherein the long-term status indicator includes one of a plurality of long-term graphical indicators that represent how the driver status is trending and is adapted to alert a driver to gradual changes in driver status prior to vehicle alert warnings;
    wherein the driver status is based on a predetermined time interval of the driver's proper focus, on the road in front of the vehicle, indicating driver attentiveness.

11. The method of claim 10, wherein the displaying, via the driver state display, a short-term status indicator further includes displaying a graphical indicator of a current driver status.

12. The method of claim 11, wherein the displaying one of a plurality of long-term graphical indicators of how the driver status is trending further includes displaying one of a first long-term graphical indicator that represents an exceptional driver status, a second long-term graphical indicator that represents a normal driver status, a third long-term graphical indicator that represents a cautionary driver status, and a fourth long-term graphical indicator that represents an extreme driver status.

13. The method of claim 12, wherein sending, with the data processor, information to the driver state display and displaying, via the driver state display, the short-term status indicator and the long-term status indicator further includes:
running with the data processor, a driver status algorithm adapted to determine a driver status based on information from the driver monitoring system; and
updating a displayed short-term status indicator and a displayed long-term status indicator based on outputs from the driver status algorithm.

14. The method of claim 13, further including updating thresholds within the driver status algorithm based on information of environmental factors collected by the external sources.

15. The method of claim 14, further including updating thresholds within the driver status algorithm based on an autonomous level of the vehicle.

16. The method of claim 15, wherein the displaying, via the driver state display, contextual information further includes displaying, via the driver state display, information to the driver explaining the long-term driver status and providing suggestions to improve the long-term driver status.

17. The method of claim 13, further including determining, with the data processor:
if the driver's eyes were properly focused on the road for more than 85% of a previous pre-determined interval;
if the driver's eyes were continuously focused on the road for time intervals averaging at least four (4) seconds during the previous pre-determined interval; and
if the driver's eyes were continuously distracted from the road for time intervals averaging less than one (1) second during the previous pre-determined interval; and
altering, with the data processor, the long-term status indicator by decreasing the indication by one when:
the driver's eyes were properly focused on the road for more than 85% of the previous pre-determined interval;
the driver's eyes were continuously focused on the road for time intervals averaging at least four (4) seconds during the previous pre-determined interval; and
the driver's eyes were continuously distracted from the road for time intervals averaging less than one (1) second during the previous pre-determined interval.

18. The method of claim 17, further including determining, with the data processor:
if the driver's eyes were properly focused on the road for less than 50% of the previous pre-determined interval;
if the driver's eyes were continuously distracted from the road for time intervals averaging more than one and a half (1.5) seconds; and
if the number of glances away from the road were more than one (1) during the previous pre-determined interval; and
altering, with the data processor, the long-term status indicator by increasing the indication by one when at least one of:
the driver's eyes were continuously distracted from the road for a single time interval exceeding three (3) seconds during the previous pre-determined interval;
the driver's eyes were properly focused on the road for less than 50% of the previous pre-determined interval;
the driver's eyes were continuously distracted from the road for time intervals averaging more than one and a half (1.5) seconds, and the number of glances away from the road were more than one (1) during the previous pre-determined interval; and
the driver's eyes were continuously distracted from the road for a single time interval exceeding three (3) seconds during the previous pre-determined interval.

19. A system for providing driver status to a driver of a vehicle, comprising:
a data processor;
a plurality of sensors mounted within the vehicle and adapted to send vehicle information to the data processor;
a driver monitoring system within the vehicle adapted to send driver information to the data processor;
the data processor further adapted to collect information from external sources via a wireless data communication network and run a driver status algorithm;
a driver state display adapted to receive information from the data processor and to display:
a short-term status indicator that is a graphical indicator of a current driver status based on output from the driver status algorithm;
a long-term status indicator that is one of a plurality of long-term graphical indicators that represent how the driver status is trending based on output from the driver status algorithm and is adapted to alert a driver to gradual changes in driver status indicating increased driver distraction prior to vehicle alert warnings; and
contextual information that includes an explanation of the displayed long-term driver status and suggestions to improve the long-term driver status;
wherein, the data processor is adapted to alter the long-term status indicator by decreasing the indication by one when:
the driver's eyes were properly focused on the road for more than 85% of the previous pre-determined interval;
the driver's eyes were continuously focused on the road for time intervals averaging at least four (4) seconds during the previous pre-determined interval; and
the driver's eyes were continuously distracted from the road for time intervals averaging less than one (1) second during the previous pre-determined interval; and
wherein, the data processor is adapted to alter the long-term status indicator by increasing the indication by one when at least one of:
the driver's eyes were continuously distracted from the road for a single time interval exceeding three (3) seconds during the previous pre-determined interval;
the driver's eyes were properly focused on the road for less than 50% of the previous pre-determined interval;
the driver's eyes were continuously distracted from the road for time intervals averaging more than one and a half (1.5) seconds, and the number of glances away from the road were more than one (1) during the previous pre-determined interval; and
the driver's eyes were continuously distracted from the road for a single time interval exceeding three (3) seconds during the previous pre-determined interval.

20. The system of claim 19, wherein the data processor is further adapted to update thresholds within the driver status algorithm based on information of environmental factors collected by the external sources and based on an autonomous level of the vehicle.

\* \* \* \* \*